(12) United States Patent
Liu et al.

(10) Patent No.: US 12,370,998 B2
(45) Date of Patent: Jul. 29, 2025

(54) VEHICLE AND CONTROL METHOD THEREOF, CONTROL APPARATUS, VEHICLE-MOUNTED DEVICE AND MEDIUM

(71) Applicant: NIO TECHNOLOGY (ANHUI) CO., LTD, Hefei (CN)

(72) Inventors: Ze Liu, Shanghai (CN); Haimiao Li, Shanghai (CN); Hongchao Zhang, Shanghai (CN); Bohong Xiao, Shanghai (CN); Da Yuan, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 344 days.

(21) Appl. No.: 18/049,306

(22) Filed: Oct. 25, 2022

(65) Prior Publication Data
US 2023/0202453 A1 Jun. 29, 2023

(30) Foreign Application Priority Data
Oct. 25, 2021 (CN) .......................... 202111242623.6

(51) Int. Cl.
*B60W 10/08* (2006.01)
*B60W 20/10* (2016.01)

(52) U.S. Cl.
CPC ............ *B60W 10/08* (2013.01); *B60W 20/10* (2013.01); *B60W 2510/207* (2013.01); *B60W 2540/18* (2013.01); *B60W 2710/083* (2013.01)

(58) Field of Classification Search
CPC ................. B60W 10/08; B60W 20/10; B60W 2510/207; B60W 2540/18;
(Continued)

(56) References Cited

U.S. PATENT DOCUMENTS 9,365,196 B2 6/2016 Vorreiter et al.
2013/0030601 A1 1/2013 Yoon
2024/0278786 A1* 8/2024 Chaudet .............. B60W 30/188

FOREIGN PATENT DOCUMENTS

CN 101565043 10/2009
CN 102248936 11/2011
(Continued)

OTHER PUBLICATIONS

Official Action with English Translation for China Patent Application No. 202111242623.6, dated Jun. 1, 2024, 15 pages.
(Continued)

*Primary Examiner* — Alan D Hutchinson
(74) *Attorney, Agent, or Firm* — Sheridan Ross P.C.

(57) ABSTRACT

The disclosure relates to the field of vehicle technologies, and specifically, to a vehicle control method and system, a vehicle, a control apparatus, a vehicle-mounted device, and a computer-readable storage medium. The disclosure aims to solve the following technical problem: Since a distinction between understeering and oversteering conditions is not taken into consideration when increasing the engine torque, there is still room for improvement in a formulated engine torque increasing strategy. For this purpose, the disclosure provides a vehicle control method and system, a vehicle, a control apparatus, a vehicle-mounted device, and a computer-readable storage medium, where the control method includes: when an abnormal state occurs in a vehicle in a steering condition, determining whether the current abnormal state is understeering or oversteering; and adjusting torque of the vehicle based on a determining result and a torque amount adjustment mechanism predetermined for the current abnormal state. Through such settings, a feasible torque adjustment strategy can be provided for each of the understeering and oversteering conditions.

11 Claims, 5 Drawing Sheets

(58) Field of Classification Search
CPC ... B60W 2710/083; B60W 2050/0026; B60W 2520/14; B60W 30/18145; B60W 30/045; B62D 15/025
See application file for complete search history.

(56) References Cited

FOREIGN PATENT DOCUMENTS

| | | |
|---|---|---|
| CN | 110606080 | 12/2019 |
| CN | 112550430 | 3/2021 |
| CN | 113525347 | 10/2021 |
| DE | 102007034142 | 1/2009 |
| EP | 2147842 | 1/2010 |

OTHER PUBLICATIONS

Search Report for European Patent Application No. 22203407.6, dated Mar. 2, 2023, 4 pages.
Official Action for European Patent Application No. 22203407.6, dated Mar. 16, 2023, 7 pages.

\* cited by examiner

VEHICLE AND CONTROL METHOD THEREOF, CONTROL APPARATUS, VEHICLE-MOUNTED DEVICE AND MEDIUM

CROSS-REFERENCE TO RELATED APPLICATIONS

This application claims the benefit of China Patent Application No. 202111242623.6 filed Oct. 25, 2021, the entire contents of which are incorporated herein by reference in its entirety.

TECHNICAL FIELD

The disclosure relates to the field of vehicle technologies, and specifically, to a vehicle control method and system, a vehicle, a control apparatus, a vehicle-mounted device, and a computer-readable storage medium.

BACKGROUND

During traveling, a vehicle generally has different degrees of turning conditions. When the vehicle is in the turning condition, inaccurate turning may often occur which, for example, generally includes under-turning and over-turning. If the inaccurate turning is not corrected, it will affect the driving performance of the vehicle, for example, at least affect safety and smoothness of the vehicle to some extent.

For example, Chinese invention patent (CN 102248936 B) discloses a vehicle control method and a vehicle, and specifically discloses the following contents: Based on a current situation that "It is known to apply braking torque to the inner wheel to overcome the problem of understeer and to apply braking torque to the outer wheel to overcome the problem of oversteer. Applying the brake in this way results in a loss of the longitudinal driving force of the vehicle. To overcome this loss of longitudinal performance, it is known to increase engine torque to compensate for the loss of longitudinal drive force. However, internal combustion engines have a delay in providing the required torque, which has an adverse effect on the overall performance of the vehicle. Inaccurate torque control and delay of the internal combustion engine can interfere with normal vehicle stability events or render them inefficient.", during turning, the vehicle is controlled by using the method of "a brake torque is applied to the outer wheel when excessive steering is detected; and the electric power coupled to the electric motor connected to the first axle of the vehicle is increased in response to the application of the braking torque, where the increased electrical energy to the electric motor substantially compensates for the braking torque".

It can be seen that in this document, in response to applying the braking torque, the electrical energy of the electric motor on the axle is directly increased to increase the engine torque, so as to compensate for the applied braking torque. On the premise that the increasing tendency of the engine torque is known, the engine torque is increased based on a mapping relationship between the braking torque and the electrical energy of the electric motor. Since a distinction between understeering and oversteering conditions is not taken into consideration when increasing the engine torque, there is still room for improvement in a formulated engine torque increasing strategy.

BRIEF SUMMARY

Technical Problem

The disclosure is proposed to at least solve at least part of the above problem of "there is still room for improvement in a formulated engine torque increasing strategy" in the prior art, or to solve the problem at least to some extent.

Technical Solution

In view of this, a first aspect of the disclosure provides a vehicle control method, including: when an anomaly occurs in a vehicle in a steering condition, determining whether the current abnormal state is understeering or oversteering; adjusting torque of the vehicle based on a determining result and a torque amount adjustment mechanism predetermined for the current abnormal state.

Through such settings, a feasible torque adjustment strategy can be provided for each of understeering and oversteering conditions.

Specifically, the torque adjustment strategy based on which the torque is increased is obtained on the premise that a distinction is first made between understeering and oversteering. Therefore, better torque correction can be implemented for the two abnormal states based on such an adjustment strategy, thereby effectively avoiding a loss of the longitudinal driving force of the vehicle due to the increase in the braking torque.

It can be understood that when a distinction is made between the two abnormal states, different torque adjustment strategies may be respectively formulated for the abnormal states, for example, parameters and calculation methods for the strategies may be the same or different. For example, specific torque increasing amounts for the two abnormal states are both based on parameters 1 and 2, but after the parameters 1 and 2 are obtained, the specific torque increasing amounts are obtained based on different calculation methods, and so on.

For the above control method, in a possible implementation, the adjusting torque of the vehicle based on a determining result and a torque amount adjustment mechanism predetermined for the current abnormal state includes: when the vehicle is in understeering, adjusting the torque of the vehicle based on a first mapping relationship; and when the vehicle is in oversteering, adjusting the torque of the vehicle based on a second mapping relationship, where the first mapping relationship and the second mapping relationship are at least different in parameters involved.

Through such settings, a specific form of distinction is made between the torque amount adjustment mechanisms corresponding to understeering and oversteering.

It should be noted that the parameters herein may be different in quantity, category, and the like. On the premise that a better distinction can be made between the torque amount adjustment mechanisms for the two abnormal states, those skilled in the art may flexibly select specific forms of the two mapping relationships according to actual requirements. For example, different numbers of parameters are involved in the two mapping relationships, the first mapping relationship may be described as a correspondence between an obtainable parameter 1 and a torque amount to be added, and the second mapping relationship may be described as a correspondence between obtainable parameters 1 and 2 and a torque amount to be added, and so on.

It can be understood that those skilled in the art may determine specific forms of the first mapping relationship and the second mapping relationship according to actual conditions, as long as a torque amount determined based on a corresponding parameter can suppress or completely eliminate the current abnormal state, for example, the specific forms may include, but are not limited to, calculation formulas (simple), models (complex), and query tables (for example, based on calibration).

For the above control method, in a possible implementation, parameters involved in the first mapping relationship include a first parameter, and the first parameter is a quantity related to a steering wheel angle.

Through such settings, the specific form of the parameters involved in the first mapping relationship is given.

It should be noted that the quantity related to the steering wheel angle mentioned herein may be a directly obtained steering wheel angle (measured value), a value obtained by performing specific mathematical processing on the measured value (for example, an absolute value or a square), or a value obtained by performing specific physical processing on the measured value (for example, another parameter is introduced, a specific operation is performed on a measured steering wheel angle and the parameter, and an intermediate value used as an operation result is considered as the quantity related to the steering wheel angle), and so on.

It can be understood that the parameters involved in the first mapping relationship may include only one parameter, that is, the quantity related to the steering wheel angle, or may include another parameter in addition to the parameter, which may be flexibly selected by those skilled in the art according to actual conditions on the premise that the first mapping relationship can reflect a torque amount that needs to be added for the understeering state.

For the above control method, in a possible implementation, the first parameter is a first difference between an actual steering wheel angle corresponding to a current moment and a steady-state steering wheel angle.

Through such settings, the specific form of the first parameter is given.

It should be specially noted that a reason for using the difference of the steering wheel angle to adjust the torque amount in the case of understeering is as follows: The difference of the steering wheel angle may intuitively represent a degree of deviation of the understeering state at the current moment from a steady-state steering state. In addition, when the driver is dealing with the abnormal state of understeering, a change in the steering wheel angle may intuitively represent an operation intention of the driver. Specifically, a small range of changes in the steering wheel angle indicates that the driver may calmly deal with the abnormal state in the lateral condition, while if the range of changes in the steering wheel angle is large, it indicates that it is difficult for the driver to deal with the abnormal state in the lateral condition, for example, a normal operation of the driver in dealing with the abnormal state may cause the understeering state to become severe.

For the above control method, in a possible implementation, parameters involved in the second mapping relationship include a second parameter, and the second parameter is a quantity related to an angular yaw velocity of the vehicle.

Through such settings, the specific form of the parameters involved in the second mapping relationship is given.

Those skilled in the art may flexibly determine, according to actual requirements, the number and types of the parameters involved in the second mapping relationship and the specific form of the second parameters, which is similar to the case of the foregoing first mapping relationship.

For the above control method, in a possible implementation, the second parameter is a second difference between an ideal angular yaw velocity and an actual angular yaw velocity that are corresponding to the current moment.

Through such settings, the specific form of the second parameters is given.

It should be specially noted that a reason for using the difference of the angular yaw velocity of the vehicle to adjust the torque amount in the case of understeering oversteering is as follows: Compared to understeering, the vehicle in oversteering may be described as being in a relatively unstable state, and in this case, the difference of the angular yaw velocity is a first control target of the vehicle. Therefore, in such an abnormal state, a change state of the difference of the angular yaw velocity may more intuitively represent the oversteering of the vehicle, and is also more suitable for representing the oversteering of the vehicle.

A second aspect of the disclosure provides a vehicle control system corresponding to the foregoing vehicle control method, including: a determining module configured to: when an anomaly occurs in a vehicle in a steering condition, determine whether the current abnormal state is understeering or oversteering; and an adjustment module configured to adjust torque of the vehicle based on a determining result and a torque amount adjustment mechanism predetermined for the current abnormal state.

For the above control system, in a possible implementation, the adjustment module is further configured to: when the vehicle is in understeering, adjust the torque of the vehicle based on a first mapping relationship; and when the vehicle is in oversteering, adjust the torque of the vehicle based on a second mapping relationship, where the first mapping relationship and the second mapping relationship are at least different in parameters involved.

For the above control system, in a possible implementation, parameters involved in the first mapping relationship include a first parameter, and the first parameter is a quantity related to a steering wheel angle.

For the above control system, in a possible implementation, the first parameter is a first difference between an actual steering wheel angle corresponding to a current moment and a steady-state steering wheel angle.

For the above control system, in a possible implementation, parameters involved in the second mapping relationship include a second parameter, and the second parameter is a quantity related to an angular yaw velocity of the vehicle.

For the above control system, in a possible implementation, the second parameter is a second difference between an ideal angular yaw velocity and an actual angular yaw velocity that are corresponding to the current moment.

It can be understood that the vehicle control system has all technical effects of the vehicle control method according to any one of the foregoing aspects. Details are not provided herein again.

In the description of the disclosure, the "control module" may include hardware, software, or a combination thereof. A module may include a hardware circuit, various suitable sensors, a communication port, and a memory, or may include a software part, for example, program code, or may be a combination of software and hardware. The processor may be a central processing unit, a microprocessor, a graphics processing unit, a digital signal processor, or any other suitable processor. The processor has a data and/or signal processing function. The processor may be implemented in software, hardware, or a combination thereof. A non-transitory computer-readable storage medium includes any suitable medium that can store program code, for example, a magnetic disk, a hard disk, an optical disc, a flash memory, a read-only memory, or a random access memory.

Further, it should be understood that, since the configuration of the control module is merely used for describing functional units of the system corresponding to the vehicle control method in the disclosure, a physical device corresponding to the control module may be a processor itself, or part of software, part of hardware, or part of a combination of software and hardware in the processor. Therefore, there being one control module is merely exemplary. It can be understood by those skilled in the art that the control module may be adaptively split based on actual conditions. A specific split form of the control module does not cause the technical solutions to depart from the principle of the disclosure. Therefore, all technical solutions after the split shall fall within the scope of protection of the disclosure.

A third aspect of the disclosure provides a computer-readable storage medium, where the storage medium is adapted to store a plurality of program codes, and the program codes are adapted to be loaded and run by a processor to perform the vehicle control method according to any one of the foregoing aspects.

It can be understood that the computer-readable storage medium has all technical effects of the vehicle control method according to any one of the foregoing aspects. Details are not provided herein again.

Those skilled in the art can understand that in the disclosure, some or all of the procedures of the vehicle control method may be implemented by a computer program instructing relevant hardware. The computer program may be stored in a computer-readable storage medium. The computer program, when executed by a processor, may implement the steps of the foregoing method embodiments. The computer program includes a computer program code, and it can be understood that the program code includes, but is not limited to, a program code for performing the foregoing vehicle control method. For ease of description, only the parts related to the disclosure are shown. The computer program code may be in the form of source code, object code, executable file, or some intermediate forms. The computer-readable storage medium may include: any entity or apparatus that can carry the computer program code, such as a medium, a USB flash drive, a removable hard disk, a magnetic disk, an optical disc, a computer memory, a read-only memory, a random access memory, an electrical carrier signal, a telecommunications signal, and a software distribution medium. It should be noted that the content included in the computer-readable storage medium can be appropriately added or deleted depending on requirements of the legislation and patent practice in a jurisdiction. For example, in some jurisdictions, according to the legislation and patent practice, the computer-readable storage medium does not include an electrical carrier signal and a telecommunications signal.

A fourth aspect of the disclosure provides a control apparatus, where the control apparatus includes a memory and a processor, and the memory is adapted to store a plurality of program codes, where the program codes are adapted to be loaded and run by the processor to perform the vehicle control method according to any one of the foregoing aspects.

It can be understood that the control apparatus has all technical effects of the vehicle control method according to any one of the foregoing aspects. Details are not provided herein again. The control apparatus may be a control apparatus device formed by various electronic devices.

A fifth aspect of the disclosure provides a vehicle-mounted device, where the vehicle-mounted device includes the foregoing control apparatus.

It can be understood that the vehicle-mounted device has all technical effects of the vehicle control method according to any one of the foregoing aspects. Details are not provided herein again. The vehicle-mounted device may be a device additionally configured for the vehicle, an existing configuration device of the vehicle, or a device obtained by making specific changes to the existing configuration device.

A sixth aspect of the disclosure provides a vehicle, where the vehicle includes the foregoing control apparatus, or the vehicle includes the foregoing vehicle-mounted device.

It can be understood that the vehicle has all technical effects of the vehicle control method according to any one of the foregoing aspects. Details are not provided herein again.

Proposal 1. A vehicle control method, including:
   when an abnormal state occurs in a vehicle in a steering condition, determining whether the current abnormal state is understeering or oversteering; and
   adjusting torque of the vehicle based on a determining result and a torque amount adjustment mechanism predetermined for the current abnormal state.

Proposal 2. The control method according to proposal 1, where the adjusting torque of the vehicle based on a determining result and a torque amount adjustment mechanism predetermined for the current abnormal state includes:
   when the vehicle is in understeering, adjusting the torque of the vehicle based on a first mapping relationship; and
   when the vehicle is in oversteering, adjusting the torque of the vehicle based on a second mapping relationship,
   where the first mapping relationship and the second mapping relationship are at least different in parameters involved.

Proposal 3. The control method according to proposal 2, where parameters involved in the first mapping relationship include a first parameter, and the first parameter is a quantity related to a steering wheel angle.

Proposal 4. The control method according to proposal 3, where the first parameter is a first difference between an actual steering wheel angle corresponding to a current moment and a steady-state steering wheel angle.

Proposal 5. The control method according to any one of proposals 2 to 4, where parameters involved in the second mapping relationship include a second parameter, and the second parameter is a quantity related to an angular yaw velocity of the vehicle.

Proposal 6. The control method according to proposal 5, where the second parameter is a second difference between an ideal angular yaw velocity and an actual angular yaw velocity that are corresponding to the current moment.

Proposal 7. A vehicle control system, including:
   a determining module configured to: when an anomaly occurs in a vehicle in a steering condition, determine whether the current abnormal state is understeering or oversteering; and
   an adjustment module configured to adjust torque of the vehicle based on a determining result and a torque amount adjustment mechanism predetermined for the current abnormal state.

Proposal 8. The control system according to proposal 7, where the adjustment module is further configured to:
   when the vehicle is in understeering, adjust the torque of the vehicle based on a first mapping relationship; and when the vehicle is in oversteering, adjust the torque of the vehicle based on
a second mapping relationship,
where the first mapping relationship and the second mapping relationship are at least different in parameters involved.

Proposal 9. The control system according to proposal 8, where parameters involved in the first mapping relationship include a first parameter, and the first parameter is a quantity related to a steering wheel angle.

Proposal 10. The control system according to proposal 9, where the first parameter is a first difference between an actual steering wheel angle corresponding to a current moment and a steady-state steering wheel angle.

Proposal 11. The control system according to any one of proposals 8 to 10, where parameters involved in the second mapping relationship include a second parameter, and the second parameter is a quantity related to an angular yaw velocity of the vehicle.

Proposal 12. The control system according to proposal 11, where the second parameter is a second difference between an ideal angular yaw velocity and an actual angular yaw velocity that are corresponding to the current moment.

Proposal 13. A computer-readable storage medium, where the storage medium is adapted to store a plurality of program codes, and the program codes are adapted to be loaded and run by a processor to perform the vehicle control method according to any one of proposals 1 to 6.

Proposal 14. A control apparatus, including a memory and a processor, where the memory is adapted to store a plurality of program codes, and the program codes are adapted to be loaded and run by the processor to perform the vehicle control method according to any one of proposals 1 to 6.

Proposal 15. A vehicle-mounted device, including the control apparatus according to proposal 14.

Proposal 16. A vehicle, including the control apparatus according to proposal 14; or including the vehicle-mounted device according to proposal 15.

BRIEF DESCRIPTION OF THE SEVERAL VIEWS OF THE DRAWINGS

The disclosure is described below with reference to the accompanying drawings in conjunction with an electric vehicle with a power source on the front axle (hereinafter referred to as the front-wheel drive). In the accompanying drawings.

DETAILED DESCRIPTION

Preferred embodiments of the disclosure are described below with reference to the accompanying drawings. Those skilled in the art should understand that these implementations are only used to explain the technical principles of the disclosure, and are not intended to limit the scope of protection of the disclosure. For example, although this implementation is described based on a front-drive electric vehicle, it is not intended to limit the scope of protection of the disclosure. Without departing from the principles of the disclosure, those skilled in the art may apply the disclosure to other application scenarios. For example, the driving mode of the vehicle may alternatively be rear-wheel drive or four-wheel drive, and the type of the vehicle may alternatively be a hybrid vehicle.

It should be noted that in the description of the disclosure, the orientation terms used such as "front", "front side", "front part", "rear", "rear side" and "rear part" are all based on the front and rear directions of the vehicle after components are mounted on the vehicle. The "longitudinal", "longitudinal direction", and "longitudinal section" mentioned herein are all based on the front and rear directions of the vehicle after components are mounted on the vehicle, while the "transverse", "transverse direction", and "cross section" indicate a direction perpendicular to the longitudinal direction. The terms "a/an" and "this" in the singular form may also include the plural form. The terms "first" and "second" are for descriptive purposes only and should not be construed as indicating or implying relative importance.

In addition, for better description of the disclosure, many details are provided in the following specific implementations, and those skilled in the art should understand that, without some specific details, the disclosure can still be implemented. In some instances, principles of cooking utensils, etc. well known to those skilled in the art are not described in detail in order to highlight the gist of the disclosure.

Figure 1:
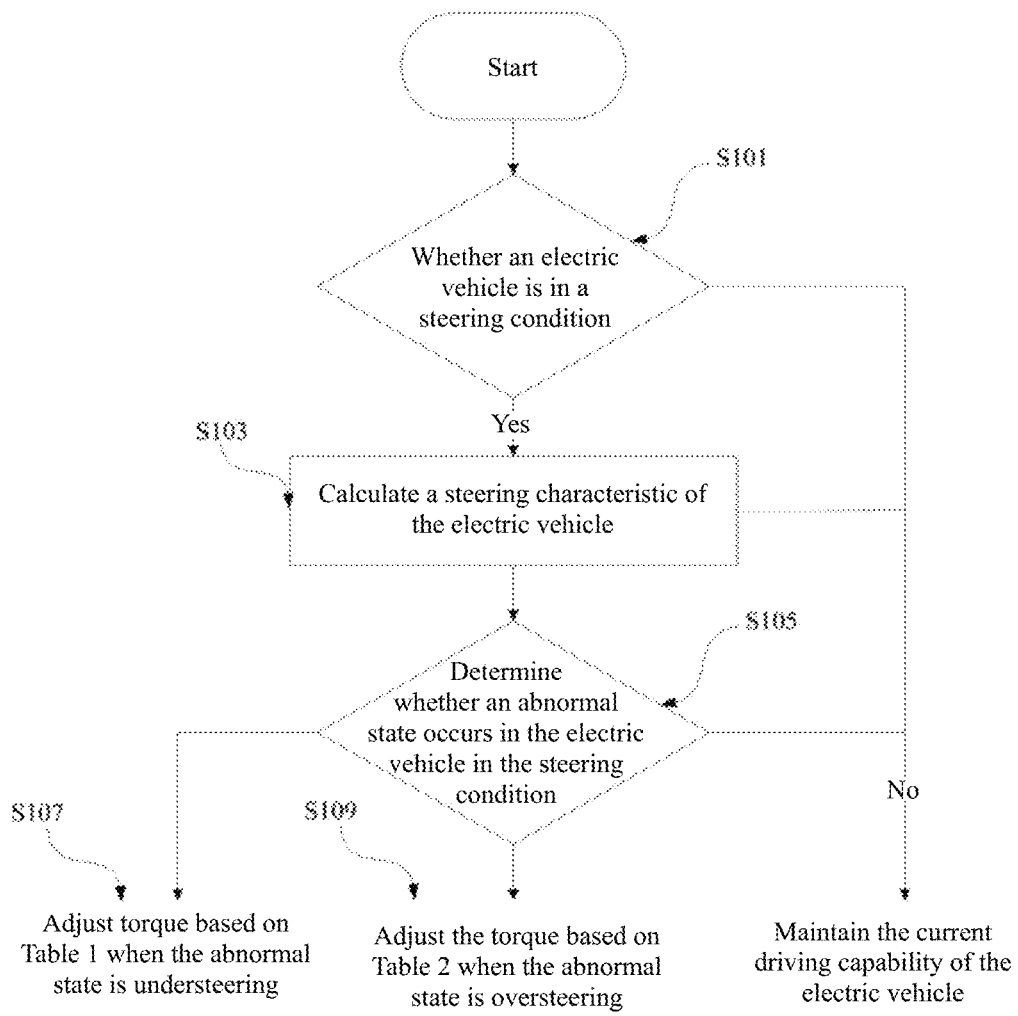
FIG. 1 is a schematic flowchart of a control method for an electric vehicle according to an embodiment of the disclosure.
Figure 2A:
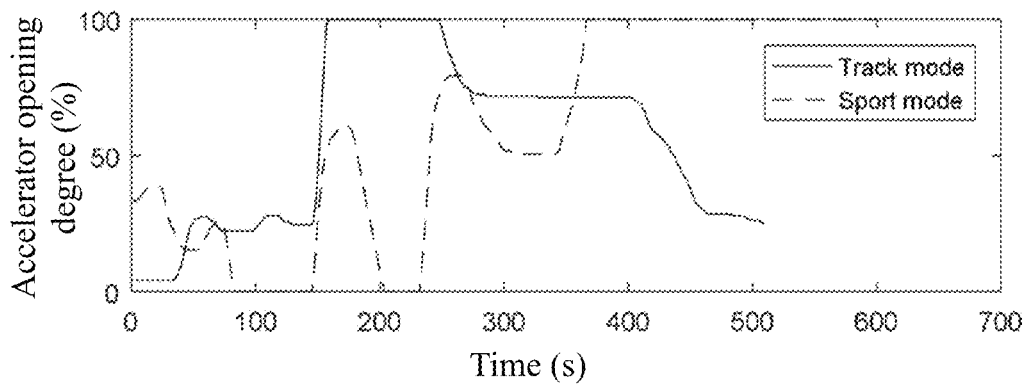
FIG. 2A is a comparison diagram 1 of measured exit data.
Figure 2B:
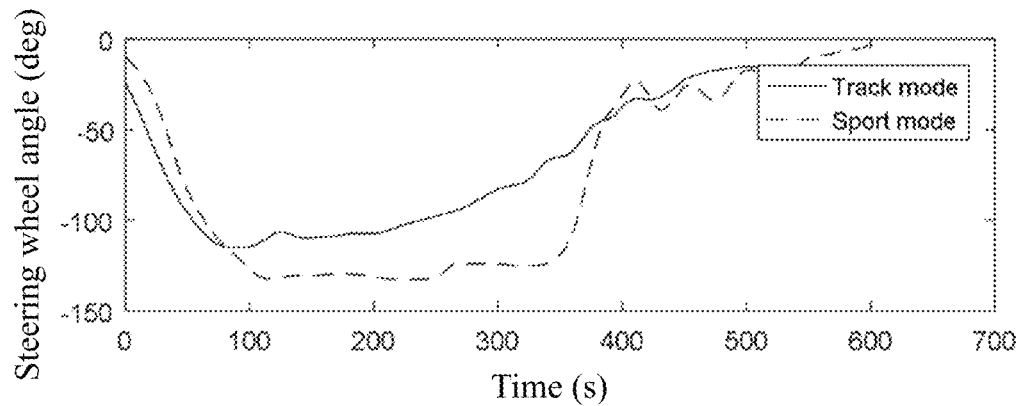
FIG. 2B is a comparison diagram 2 of measured exit data.
Figure 2C:
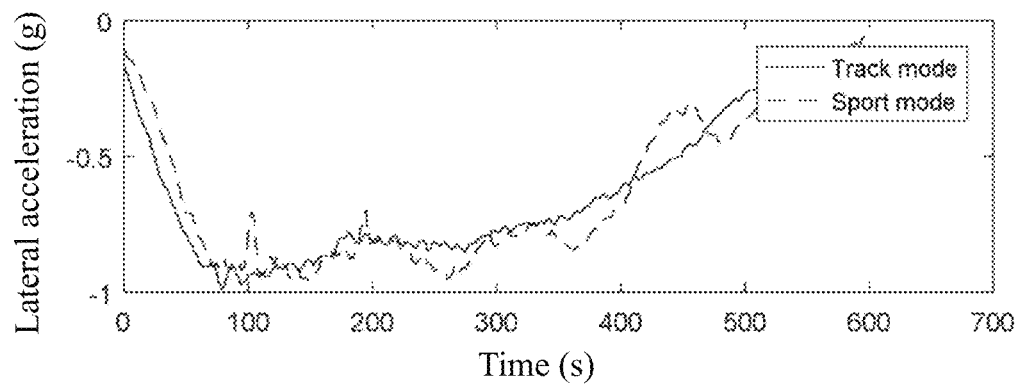
FIG. 2C is a comparison diagram 3 of measured exit data.
Figure 2D:
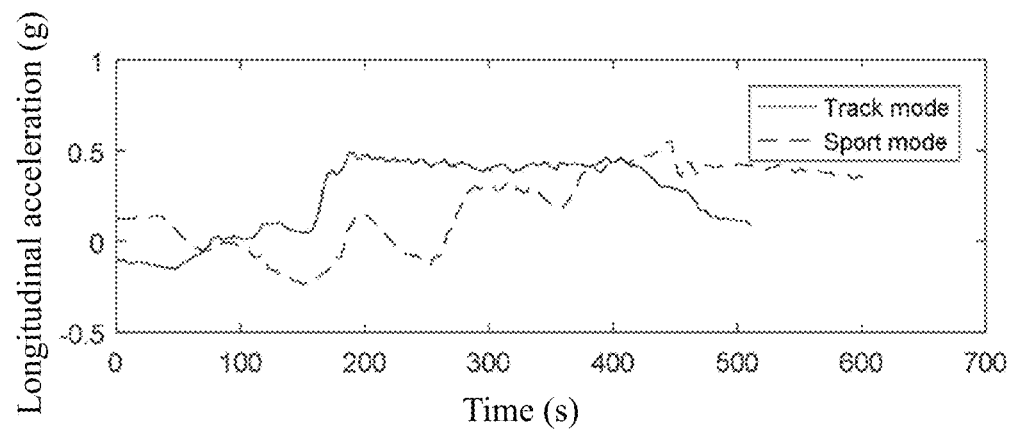
FIG. 2D is a comparison diagram 4 of measured exit data.

FIG. 1 is a schematic flowchart of a control method for an electric vehicle according to an embodiment of the disclosure. As shown in FIG. 1, the control method mainly includes the following steps.

In S101, whether the electric vehicle is in a steering condition is determined, and if the electric vehicle is in the steering condition, S103 is performed; or if the electric vehicle is not in the steering condition, the current driving capability of the electric vehicle is maintained.

In S103, a steering characteristic of the electric vehicle is calculated.

In S105, whether an abnormal state (understeering or oversteering) occurs in the electric vehicle in the steering condition based on the steering characteristic, and if an abnormal state occurs in the electric vehicle, S105 or S107 is performed based on the specific abnormal state; or if no abnormal state occurs in the electric vehicle, the current driving capability of the electric vehicle is maintained.

In a possible implementation, for example, whether the steering characteristic of the electric vehicle is understeering or oversteering can be determined based on a difference between an actual steering wheel angle and a steady-state steering wheel angle, a difference between an actual angular yaw velocity and an ideal angular yaw velocity, or the like of the electric vehicle.

It should be noted that the understeering and the oversteering herein are mainly for non-longitudinal driving. Specifically, when the driving capability (torque) is dynamically adjusted, a state of the steering characteristic of the electric vehicle and whether the electric vehicle is in a longitudinal driving state are determined (obtainable input quantities may include, but are not limited to, an angular yaw velocity deviation, a road adhesion estimation, a driving mode, a steering wheel angle, a lateral acceleration, and reference vehicle speed), and if the electric vehicle is in the longitudinal driving state, the torque is not adjusted. The torque is dynamically adjusted for understeering and oversteering only when it is determined that the electric vehicle is in the non-longitudinal driving state, and the effects of load transfer on the longitudinal characteristic of the tires is taken into consideration at the same time.

In S105, when understeering occurs in the electric vehicle in a steering process, a first difference (in unit of rad) is determined by comparing a steering wheel angle input by the driver with a steady-state steering wheel angle, and the driving capability of the front axle is dynamically adjusted by querying a table (referring to Table 1 below, which shows a correspondence between a first difference, a torque before adjustment, and a torque after adjustment in the case of understeering), thereby improving the lateral adhesion capability of a front wheel.

Table 1 Correspondence between a first difference, a torque before adjustment, and a torque after adjustment in the case of understeering:

| First difference (rad) | −50 | −40 | −30 | −20 | −10 | 0 | 10 | 20 | 30 | 50 | 70 |
|---|---|---|---|---|---|---|---|---|---|---|---|
| Torque (Nm) before adjustment | 2928 | 2928 | 2928 | 2928 | 2928 | 2928 | 2928 | 2928 | 2928 | 2928 | 2928 |
| High adhesion: torque (Nm) after adjustment | 2928 | 2800 | 2500 | 2000 | 1500 | 1200 | 1500 | 2000 | 2500 | 2800 | 2928 |
| Low adhesion: torque (Nm) after adjustment | 1756.8 | 1680 | 1500 | 1200 | 900 | 720 | 900 | 1200 | 1500 | 1680 | 1756.8 |

The torque is dynamically adjusted, so that the following case is effectively avoided: the lateral capability of a tire on the front axle is reduced due to excessive torque applied in an exit acceleration process. A principle for this case is as follows: On the basis of the theory of a friction circle of a tire, in the case of a fixed wheel load, a same slip angle, and a same slip ratio, resultant force acting on the wheel is composed of longitudinal force and lateral force. Therefore, if driving force acting on the front wheel is greater (the torque to be applied is correspondingly greater), the lateral capability of the tire of the front wheel is smaller.

In S107, when oversteering occurs in the electric vehicle in a steering process, a second difference (in unit of rad/s) is determined by comparing an ideal angular yaw velocity with an actual angular yaw velocity, and the torque of the front axle is dynamically adjusted by querying a table (referring to Table 2 below, which shows a correspondence between a second difference, a torque before adjustment, and a torque after adjustment in the case of oversteering), thereby improving the lateral adhesion capability of the front wheel. The torque is dynamically adjusted, so that the following case is avoided: the lateral capability of the tire of the front wheel is reduced due to excessive torque applied in an orientation correction process of the electric vehicle.

Table 2 Correspondence between a first difference, a torque before adjustment, and a torque after adjustment in the case of oversteering:

| Second difference (deg/s) | −3 | −2.5 | −2 | −1.5 | −1 | −0.5 | −0.25 | 0 | 0.25 | 0.5 | 1 | 1.5 | 2 | 2.5 | 3 |
|---|---|---|---|---|---|---|---|---|---|---|---|---|---|---|---|
| Torque (Nm) before adjustment | 2928 | 2928 | 2928 | 2928 | 2928 | 2928 | 2928 | 2928 | 2928 | 2928 | 2928 | 2928 | 2928 | 2928 | 2928 |
| Low adhesion: torque (Nm) after adjustment | 2928 | 2928 | 2928 | 2928 | 2928 | 2928 | 2928 | 2928 | 1200 | 900 | 450 | 300 | 150 | 0 | 0 |
| High adhesion: torque (Nm) after adjustment | 2928 | 2928 | 2928 | 2928 | 2928 | 2928 | 2928 | 2928 | 1200 | 1760 | 1520 | 1200 | 960 | 640 | 640 |

In this way, the abnormal states of understeering and oversteering of the electric vehicle are intervened to some extent by dynamically adjusting the torque, thereby implementing precise control of the electric vehicle during steering and ensuring the performance of the electric vehicle.

Obviously, Table 1 and Table 2 are only specific forms of the first mapping relationship and the second mapping relationship, respectively, and those skilled in the art may change Table 1 and Table 2 to some extent according to actual requirements, or replace them with other forms of expression.

FIGS. 2A, 2B, 2C, and 2D are respectively comparison diagrams 1, 2, 3 and 4 of measured exit data. The horizontal coordinates in FIGS. 2A, 2B, 2C, and 2D each represent an exit duration in the steering condition, and the vertical coordinates in FIGS. 2A, 2B, 2C, and 2D respectively represent an accelerator pedal percentage (in unit of %, representing an opening degree of the accelerator pedal), a steering wheel angle (in unit of deg), a lateral acceleration (in unit of g), and a longitudinal acceleration (in unit of g) that are corresponding to the exit duration. The solid lines in the figures represent data in the track mode that is obtained when the control method of the disclosure is used, and the dashed lines in the figures represent data in the sport mode that is obtained when the control method of the disclosure is not used. As shown in FIGS. 2A, 2B, 2C, and 2D, it can be seen from the two sets of data for the lateral accelerations in the ultimate state that, to increase an exit speed, it is necessary for an electric vehicle with a power source on the front axle to overcome the understeering caused by the attenuation of the lateral adhesion capability of the front wheel in the lateral acceleration condition. Alternatively, if only the control by the driver is needed, it is required that the driver release the accelerator pedal or even brake to control the exit speed, which reduces the exit speed and affects the driving experience. However, in the track mode of the control method of the disclosure, the driver is allowed in most cases to step deeper on the pedal to obtain a higher pedal percentage and turn the steering wheel by a smaller steering wheel angle, and the electric vehicle may still have a higher longitudinal acceleration in the lateral condition. Therefore, the understeering is significantly improved and the driving experience is also enhanced.

Figure 3A:
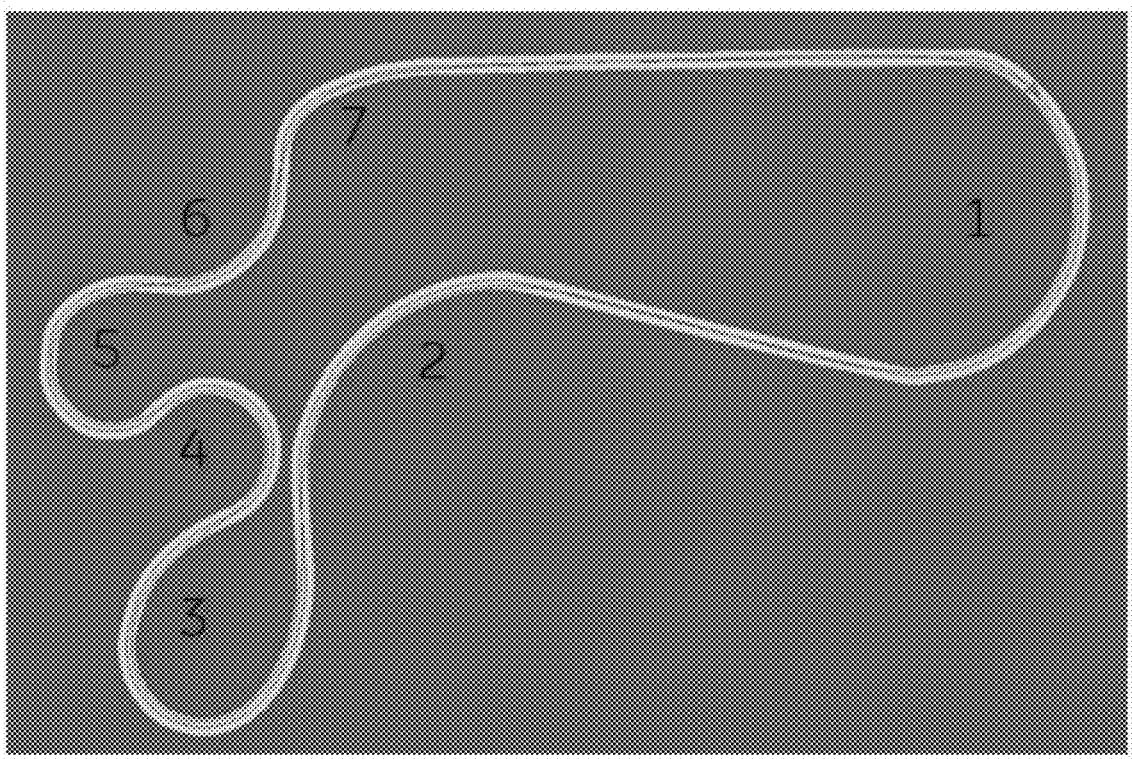
FIG. 3A is a schematic structural diagram of a track used in a test.
Figure 3B:
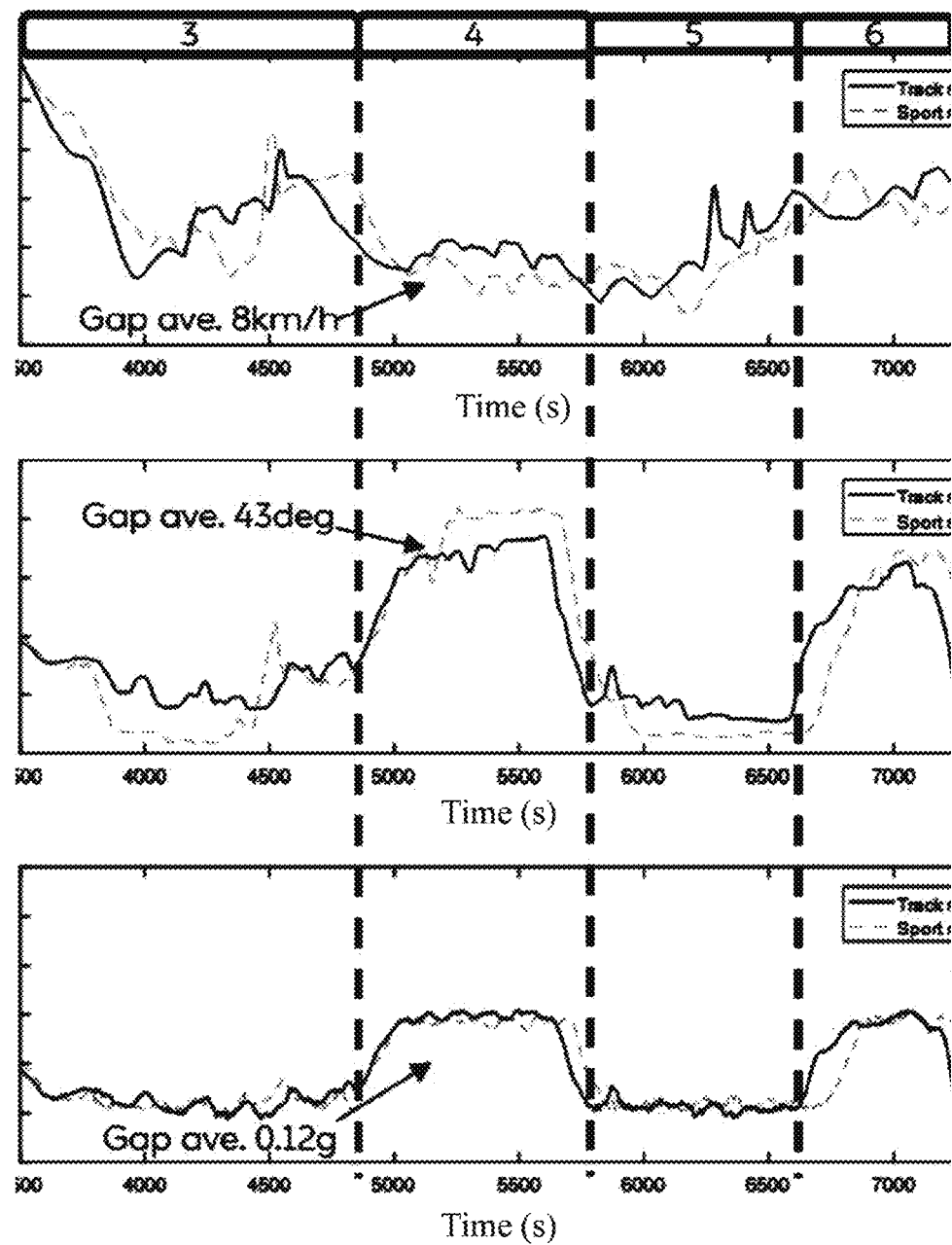
FIG. 3B is a comparison diagram of data measured when an electric vehicle exits all the corners of the track in FIG. 3A.

FIG. 3A is a schematic structural diagram of a track used for a test, and FIG. 3B is a comparison diagram of data measured when an electric vehicle exits all the corners of the track in FIG. 3A. The solid lines in FIG. 3B represent data obtained when the control method of the disclosure is used (with dynamic torque adjustment involved), and the dashed lines in FIG. 3B represent data obtained when the control method of the disclosure is not used (with dynamic torque adjustment not involved). The horizontal coordinates in FIG. 3B each represent corners (3, 4, 5, 6, 7) in sequence, and the three vertical coordinates in FIG. 3B respectively represent an exit speed, a steering wheel angle, and a lateral acceleration at a specific corner (obtained when the electric vehicle exits the corner). It can be seen that when the electric vehicle exits the same turn of the track, an angle by which the driver turns the steering wheel is reduced, a speed at which the electric vehicle exits the turn increases, and a lateral acceleration can still be maintained at the limit level. When dynamic torque adjustment is involved, a lateral limit of the electric vehicle is further increased in most cases, and a steering wheel angle is reduced while an exit vehicle speed is increased.

Figure 4:
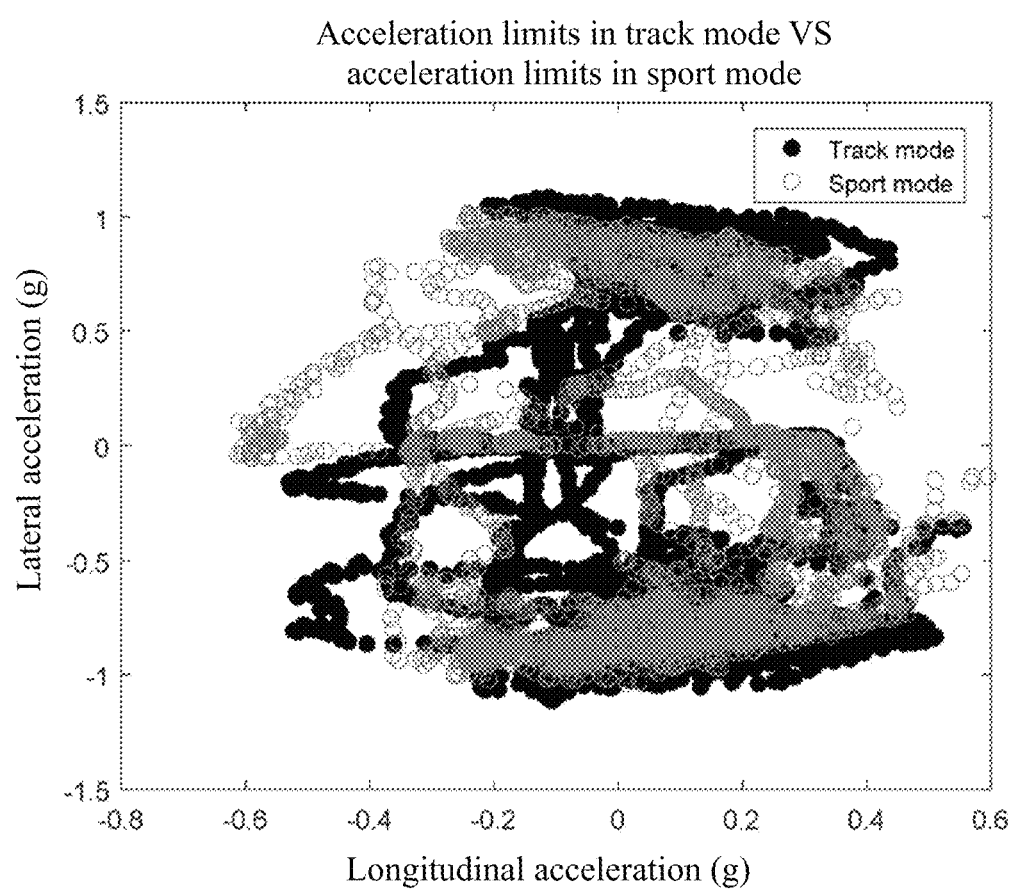
FIG. 4 is a comparison diagram of acceleration limits of an electric vehicle under the same track conditions.

FIG. 4 is a comparison diagram of a longitudinal acceleration limit and a lateral acceleration limit of an electric vehicle on the track in FIG. 3A. The horizontal coordinate in FIG. 4 represents a longitudinal acceleration (in unit of g) of the electric vehicle, the vertical coordinate in FIG. 4 represents a lateral acceleration (in unit of g) of the electric vehicle, the solid part in FIG. 4 represents data in the track mode that is obtained when the control method of the disclosure is used, and the hollow part in FIG. 4 represents data in the sport mode that is obtained when the control method of the disclosure is not used. It can be seen that the lateral limit capability of the electric vehicle increases significantly when the dynamic torque adjustment is involved.

FIG. 3 (FIGS. 3A and 3B) and FIG. 4 are based on the same set of test data for the track. FIG. 4 shows overall comparison data of acceleration limits for the track, and FIG. 3 (FIGS. 3A and 3B) mainly shows comparison data for a specific turn of the track, that is, crosswise comparison data between an exit speed, a steering wheel angle, and a lateral acceleration obtained when the electric vehicle exits each corner of a turn.

It can be seen that, through the torque adjustment mechanism based on the control method for an electric vehicle of the disclosure, the performance of the electric vehicle is improved in the case of understeering and oversteering of the electric vehicle.

It should be noted that although the steps are described in a specific order in the foregoing embodiment, those skilled in the art can understand that in order to achieve the effects of the disclosure, different steps are not necessarily performed in this order, but may be performed simultaneously or in another order, or some steps may be added, replaced, or deleted, and these variations all fall within the scope of protection of the disclosure. For example, it may be the following case: changes are made to Table 1 and Table 2 for query, and so on.

It should be noted that, although an example in which the control method formed in the foregoing specific manner is used for description, those skilled in the art can understand that the disclosure is not limited to this. In fact, a user can flexibly adjust elements such as related steps and parameters in related steps based on actual application scenarios, for example, the abnormal state is further subdivided, and so on.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

What is claimed is:

1. A vehicle control method, comprising:
   when an abnormal state occurs in a vehicle in a steering condition, determining whether the current abnormal state is understeering or oversteering; and
   adjusting torque of the vehicle based on a determining result and a torque amount adjustment mechanism predetermined for the current abnormal state;
   wherein the adjusting torque of the vehicle based on a determining result and a torque amount adjustment mechanism predetermined for the current abnormal state comprises:
   when the vehicle is in understeering, adjusting the torque of the vehicle based on a first mapping relationship; and
   when the vehicle is in oversteering, adjusting the torque of the vehicle based on a second mapping relationship,
   wherein the first mapping relationship and the second mapping relationship are at least different in parameters involved.

2. The control method according to claim 1, wherein parameters involved in the first mapping relationship comprise a first parameter, and the first parameter is a quantity related to a steering wheel angle.

3. The control method according to claim 2, wherein the first parameter is a first difference between an actual steering wheel angle corresponding to a current moment and a steady-state steering wheel angle.

4. The control method according to claim 1, wherein parameters involved in the second mapping relationship comprise a second parameter, and the second parameter is a quantity related to an angular yaw velocity of the vehicle.

5. The control method according to claim 4, wherein the second parameter is a second difference between an ideal angular yaw velocity and an actual angular yaw velocity that are corresponding to the current moment.

6. A vehicle control system, comprising:
   a determining module configured to: when an anomaly occurs in a vehicle in a steering condition, determine whether the current abnormal state is understeering or oversteering; and
   an adjustment module configured to adjust torque of the vehicle based on a determining result and a torque amount adjustment mechanism predetermined for the current abnormal state;
   wherein the adjustment module is further configured to:
   when the vehicle is in understeering, adjust the torque of the vehicle based on a first mapping relationship; and
   when the vehicle is in oversteering, adjust the torque of the vehicle based on a second mapping relationship,
   wherein the first mapping relationship and the second mapping relationship are at least different in parameters involved.

7. The control system according to claim 6, wherein parameters involved in the first mapping relationship comprise a first parameter, and the first parameter is a quantity related to a steering wheel angle.

8. The control system according to claim 7, wherein the first parameter is a first difference between an actual steering wheel angle corresponding to a current moment and a steady-state steering wheel angle.

9. The control system according to claim 6, wherein parameters involved in the second mapping relationship comprise a second parameter, and the second parameter is a quantity related to an angular yaw velocity of the vehicle.

10. The control system according to claim 9, wherein the second parameter is a second difference between an ideal angular yaw velocity and an actual angular yaw velocity that are corresponding to the current moment.

11. A computer-readable storage medium, wherein the storage medium is adapted to store a plurality of program codes, and the program codes are adapted to be loaded and run by a processor to perform the vehicle control method according to claim 1.

* * * * *